United States Patent [19]

Robinson et al.

[11] 4,447,185

[45] May 8, 1984

[54] CONTAINER TIPPING APPARATUS

[75] Inventors: David S. Robinson; Rupert M. Taylor, both of Mhlume, South Africa

[73] Assignee: Mhlume (Swaziland) Sugar Company Limited, Mhlume, South Africa

[21] Appl. No.: 195,682

[22] Filed: Oct. 9, 1980

[30] Foreign Application Priority Data

Oct. 11, 1979 [GB] United Kingdom ............... 7935266

[51] Int. Cl.³ ............................................. B65G 65/34
[52] U.S. Cl. ..................................... 414/420; 414/391; 414/421
[58] Field of Search ............... 414/354, 362, 366, 371, 414/420, 421, 546

[56] References Cited

U.S. PATENT DOCUMENTS 3,342,358 9/1967 French et al. ..................... 414/420
4,058,229 11/1977 Triplett ............................. 414/546
4,285,624 8/1981 Propst et al. ..................... 414/362

FOREIGN PATENT DOCUMENTS 1034612 6/1966 United Kingdom .
1113611 5/1968 United Kingdom .

OTHER PUBLICATIONS

Cameco "Porta-Box" Dumper Drawings.

Primary Examiner—Robert G. Sheridan
Attorney, Agent, or Firm—Sughrue, Mion, Zinn, Macpeak and Seas

[57] ABSTRACT

A container tipping apparatus has a carrier member rotatably mounted to a coupling link which, in turn, is rotatably mounted to a support post. The carrier member is engaged with a container to be tipped. The carrier member is rotatable freely relative to the coupling link as the coupling link is rotated from its lowest extreme position to an intermediate position below its elevated extreme position. Accordingly, the carrier member is free to rotate relative to the coupling link and in a direction which is opposite to the direction the coupling link is initially rotated so that the carrier member initially lifts the container, in a substantially vertical manner, off of a conveyance which transports the container.

17 Claims, 7 Drawing Figures

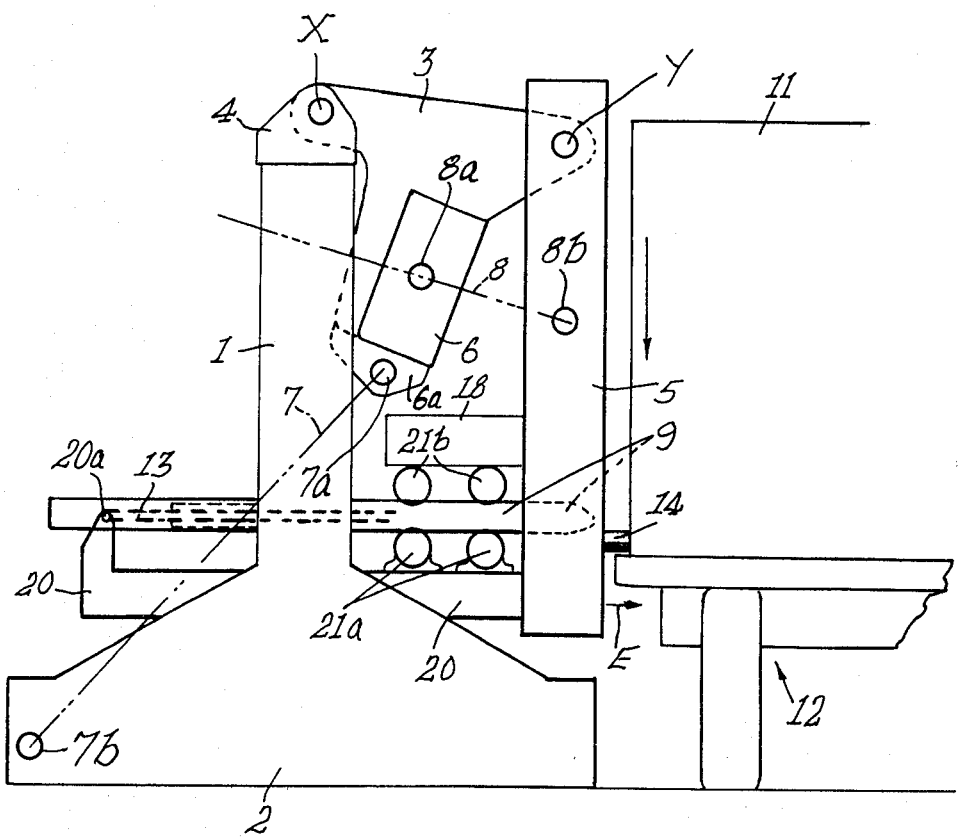

CONTAINER TIPPING APPARATUS

BACKGROUND OF THE INVENTION

This invention relates to a container tipping apparatus for unloading bulk material containers, such as sugar cane bins.

It is known in the sugar industry to load cut sugar cane in a cane field into an open-topped bin located on a trailer or other suitable wheeled conveyance for transport to a mill or other unloading station. With a known unloading system, the loaded bin is first lifted off its conveyance at the unloading station and is then transferred from the conveyance to a tipping apparatus operative to rotate the bin along an upward arcuate path to overturn or tilt it to discharge its contents under gravity. Thereafter the emptied bin is lowered again by the tipping apparatus, and is finally transferred from the tipping apparatus back to the conveyance. Distinct operations are required to transfer the loaded bin from the conveyance to the tipping apparatus and to transfer the emptied bin from the tipping apparatus back to the conveyance. Such an unloading arrangement is not only relatively complicated and expensive in construction, but the unloading sequence is also time consuming, so that a bin has an extended turn-around time at the unloading station.

SUMMARY OF THE INVENTION

It is accordingly an object of the present invention to provide an improved tipping apparatus with which unloading of a bulk material container may be simplified and expedited.

According to the invention, a container tipping apparatus includes support means; carrier means; and coupling means between the support means and the carrier means, the coupling means being rotatably connected to the support means and to the carrier means and being rotatable relative to the support means between a lower extreme position and an upper extreme position, the carrier means being movable between a lowered extreme position in which the carrier means is engageable with a container located adjacent the tipping apparatus and an elevated extreme position in which the container is positioned to discharge its contents under gravity, the carrier means being freely rotatable relative to the coupling means and movable substantially vertically by the coupling means during at least an initial part of the rotation of the latter away from its lower extreme position, towards its upper extreme position whereby the initial part of the path of travel of the carrier means away from its lowered extreme position towards its elevated extreme position is substantially vertical.

The apparatus according to the invention is particularly, but not exclusively, suitable for discharging the contents of a container located on a conveyance with a resilient suspension which causes or allows a change in the effective height of the conveyance when a change in a load on the conveyance occurs.

Since the initial part of the path of travel of the carrier means away from its lowered extreme position is substantially vertical, the carrier means is adapted to lift a container substantially vertically off a conveyance so that an increase in the effective height of the conveyance due to a decrease in the load on the springs and/or other suspension means of the conveyance can be accommodated substantially without interference between the container and the conveyance.

The final part of the path of travel of the carrier means back to its lowered extreme position from its elevated extreme position may also be substantially vertical. The carrier means is thus also adapted to lower the container substantially vertically onto the conveyance so that a decrease in the effective height of the conveyance due to an increase in the load on the suspension means can be accommodated substantially without interference between the container and the conveyance.

The carrier means may be arranged not only to lift a container directly from its conveyance during upward movement of the carrier means from its lowered extreme position towards its elevated extreme position, but also to lower the container directly onto its conveyance during downward return movement of the carrier means from its elevated extreme position back to its lowered extreme position. This minimizes the number of different operations required to remove the container from its conveyance, discharge the contents of the container and return the latter to its conveyance, thereby to minimize the turn-around time of a container at an unloading station.

The carrier means may be movable arcuately relative to the support means and/or to the coupling means in the region of the path of travel of the carrier means between the upper end of the initial vertical part of its path of travel and its elevated extreme position.

The coupling means may be rotatable relative to the support means between its lower extreme position and its upper extreme position through an intermediate position, the carrier means being freely rotatable relative to the coupling means and movable along the vertical part of its path of travel by the coupling means during rotation of the latter between its lower extreme position and its intermediate position, the carrier means further being movable along an arcuate path with the coupling means during rotation of the latter between its intermediate position and its upper extreme position.

The coupling means may be adapted to engage the carrier means or may be associated with means for engaging the carrier means during rotation of the coupling means between its intermediate position and its upper extreme position, thereby to prevent relative rotation between the coupling means and the carrier means and cause the carrier means to rotate with the coupling means.

Displacement means may be provided for rotating the coupling means relative to the support means. Such displacement means may comprise double acting, fluid operable ram means.

The carrier means may be located in its elevated material discharging extreme position when the coupling means is in its upper extreme position.

Alternatively, the carrier means may be located in an intermediate position along its path of travel when the coupling means is in its upper extreme position, the carrier means being rotatable relative to the coupling means for movement between its intermediate and elevated extreme positions.

Displacement means may be provided for rotating the carrier means relative to the coupling means. Such displacement means may comprise double acting, fluid operable ram means.

The carrier means may include engagement means adapted to engage and disengage a container located adjacent the tipping apparatus when the carrier means is in its lowered extreme position.

The engagement means may comprise at least one elongated element movable into and out of a socket in the container. The engagement means may be movable by double acting, fluid operable ram means.

The tipping apparatus may include positioning means adapted suitably to position a container which is lowered onto a conveyance or other support by the carrier means. The locating means may comprise fluid operable ram means.

BRIEF DESCRIPTION OF THE DRAWINGS

For a clear understanding of the invention a preferred embodiment will now be described purely by way of example with reference to the accompanying diagrammatic drawings in which:

FIGS. 3 to 7 are similar views to that of FIG. 2 showing different stages in the operation of the tipping apparatus during which the bin is lifted vertically from the trailer, is raised to an elevated material discharge position and is lowered back onto the trailer.

DESCRIPTION OF THE PREFERRED EMBODIMENTS

Figure 1:
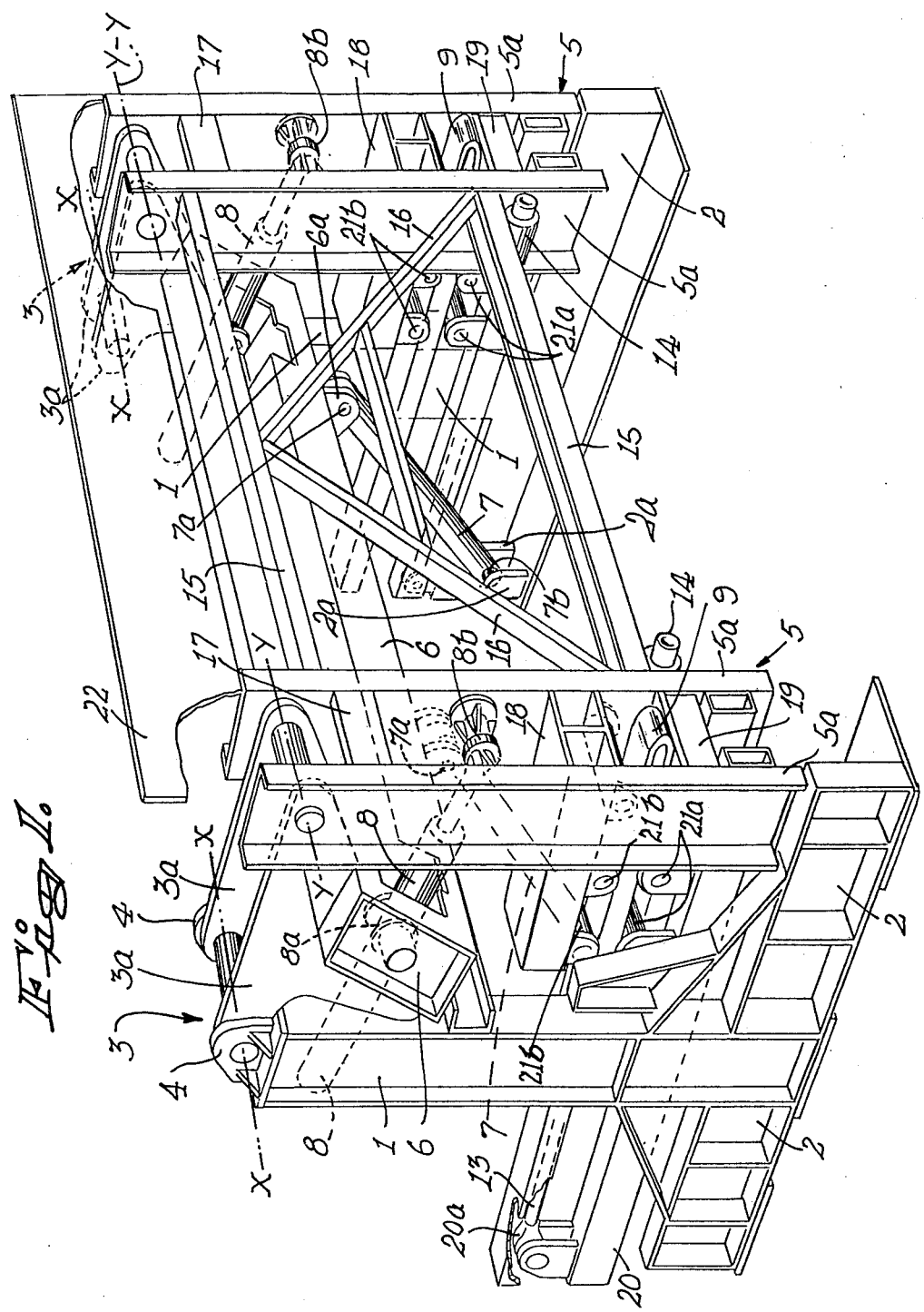
FIG. 1 is a diagrammatic perspective view of tipping apparatus according to the invention in an inoperative condition.
Figure 2:
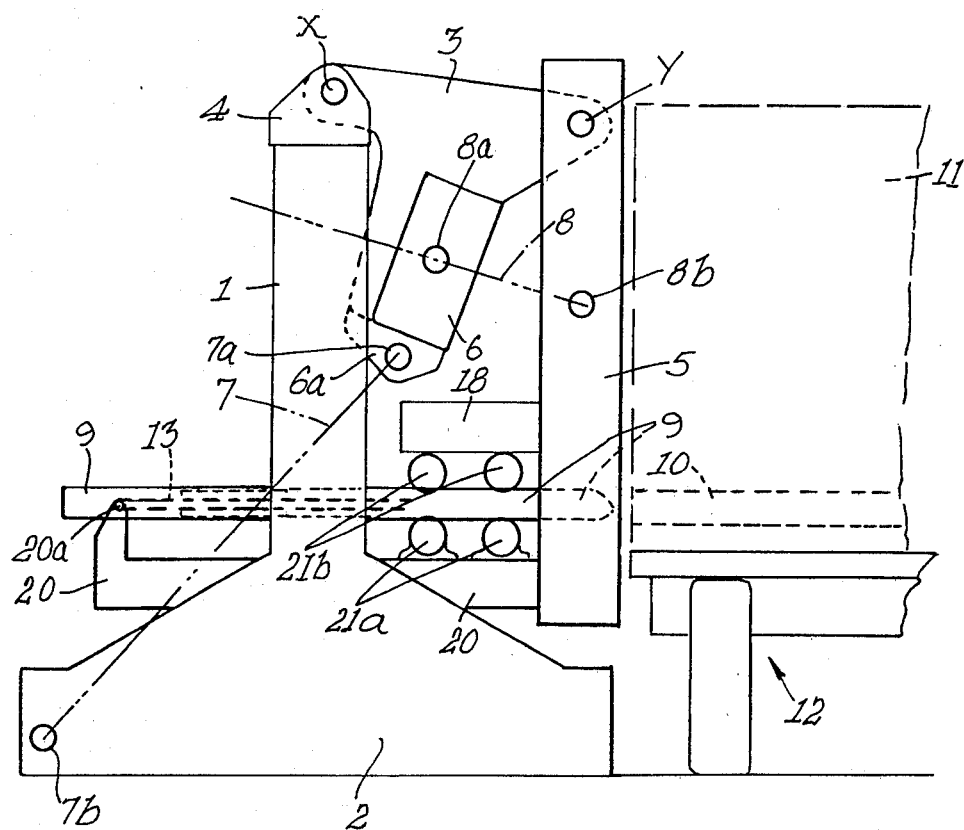
FIG. 2 is a diagrammatic end elevational view of the tipping apparatus of FIG. 1 in the inoperative condition of FIG. 1 and showing a loaded sugar cane bin located on a wheeled trailer vehicle adjacent the tipping apparatus ready for unloading.

Referring first to FIGS. 1 and 2, the tipping apparatus comprises a pair of transversely spaced support posts 1 mounted on bases 2 which are suitably anchored to the ground. A coupling link 3 is provided for each support post 1, each coupling link 3 comprising a pair of transversely spaced link elements 3a which are rotatably mounted towards one end thereof on brackets 4 which are fast with the upper end of their support post 1. The pair of coupling links 3 are rotatable about a common horizontal axis X—X relative to support posts 1 between a lower extreme position and an upper extreme position through an intermediate position.

The tipping apparatus further comprises a pair of transversely spaced, elongate carrier members 5 which are secured together by tie members 15 extending transversely between carrier members 5 and by oblique struts 16. Each carrier member 5 comprises a pair of transversely spaced carrier elements 5a which are secured together by connecting members 17, 18 and 19. Each carrier member 5 is rotatably mounted towards its upper end on its own coupling link 3 towards the end of the latter opposite to that mounted on brackets 4. Carrier members 5 are freely rotatable within predetermined limits about a common horizontal axis Y—Y relative to coupling links 3 as will be described more fully below. Carrier members 5 are movable between lowered extreme positions and elevated extreme positions.

It will be seen from FIGS. 1 and 2 that in the inoperative condition of the tipping apparatus, the carrier members 5 are located in their lowered extreme positions, hang substantially vertically from coupling links 3 and are spaced from support posts 1.

Each coupling link 3 is fast with an abutment member 6 extending transversely between coupling links 3. The abutment member 6 connects coupling links 3 together and is arranged to engage the backs of carrier members 5 after a predetermined rotation of the coupling links 3 about the horizontal axis X—X relative to support posts 1.

Towards each end of abutment member 6, a double acting, fluid operable ram 7 is pivotally mounted at 7a on brackets 6a fast with abutment member 6 and is pivotally mounted at 7b on brackets 2a fast with base 2 of the adjacent support post 1. Rams 7 are arranged to rotate coupling links 3 about horizontal axis X—X relative to support posts 1.

Towards each end of the abutment member 6, a further double acting, fluid operable ram 8 is pivotally mounted on abutment member 6 at 8a and on the associated carrier member 5 at 8b. It will be seen from FIG. 1 that each ram 8 extends through abutment member 6 in the zone of pivotal mounting 8a, and that the pivotal mounting 8b of each ram 8 is located between the elements 5a of the associated carrier member 5. Rams 8 are arranged to rotate carrier members 5 about horizontal axis Y—Y relative to coupling links 3.

Towards its lower end, each carrier member 5 is provided with a rearwardly extending lower bearer member 20 which is fast at its front end with its carrier member 5. Each lower bearer member 20 mounts a set of lower guide rollers 21a towards its front end. A set of opposed upper guide rollers 21b which are spaced from lower guide rollers 21a are mounted on an upper bearer member 18 which is also fast with the associated carrier member 5 and constitutes a connecting member between the elements 5a of the associated carrier member 5.

An elongate engagement tine 9 is provided for each carrier member 5, each tine 9 being movably engaged between the opposed upper and lower guide rollers 21a, 21b on its carrier member 5 so that each tine 9 is movable longitudinally into and out of a socket 10 which is provided towards the bottom of a bin 11 which is located on a trailer 12 adjacent the tipping apparatus. Each tine 9 is movable by means of a double acting, fluid operable ram 13 which is pivotally connected to the tine 9 and to the rear end of the associated lower bearer member 20 at 20a. The lower connecting member 19 between the elements 5a of each carrier member 5 also constitutes a support for the associated tine 9 when the latter is in its extended position.

The tipping apparatus further includes a pair of transversely spaced positioning rams 14 which are mounted on the carrier structure in positions in the proximity of engagement tines 9.

Figure 3:
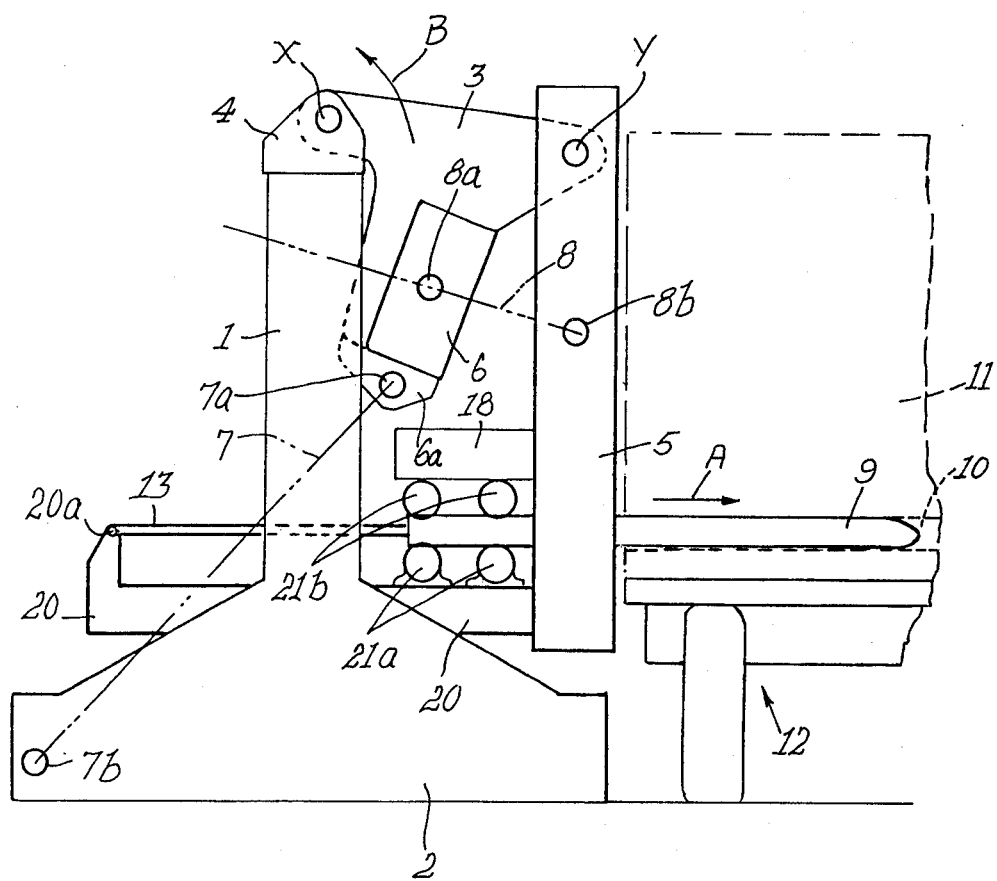

To unload a loaded bin 11 which is located on a trailer 12, the trailer 12 is moved into position adjacent the vertically located carrier members 5 when the tipping apparatus is in the inoperative condition with carrier members 5 in their lowered extreme positions as shown in FIG. 1 and 2. Rams 13 are then extended to extend tines 9 horizontally in the direction of arrow A to engage tines 9 in sockets 10 in bin 11, as shown in FIG. 3.

Figure 4:
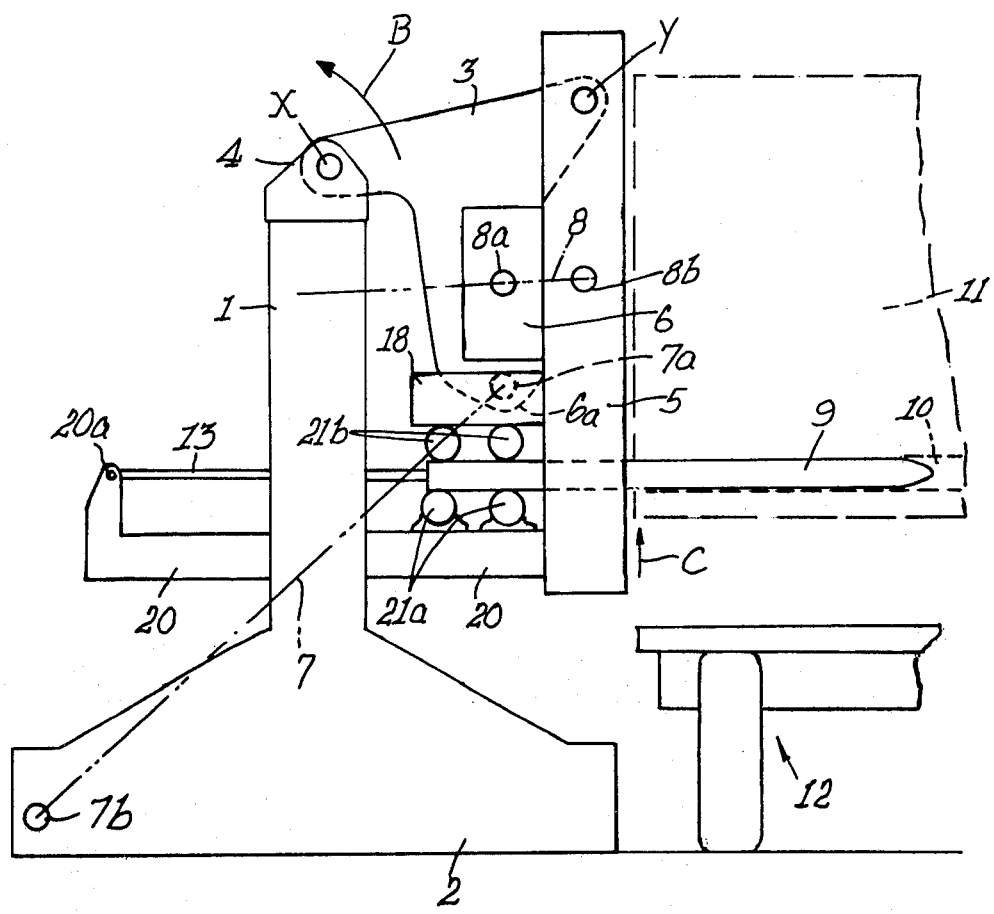

Thereafter, the rams 7 are extended to rotate coupling links 3 upwardly relative to support posts 1 about horizontal axis X in the direction of arrow B, from the lower extreme position of coupling links 3 shown in FIGS. 1 and 2 to their intermediate positions shown in FIG. 4 in which abutment member 6 engages carrier members 5. During this rotation of coupling links 3 from their lower extreme positions to their intermediate positions, free relative rotation between coupling links 3 and carrier members 5 occur so that carrier members 5 retain their vertical disposition. However, due to the upward movement of the ends of coupling links 3 which are connected to carrier members 5, the latter are lifted vertically upwardly together with tines 9 in the direction of arrow C so that the initial part of the path of travel of carrier members 5 from their lowered extreme positions towards their elevated extreme positions is substantially vertical. Tines 9 act to lift bin 11 vertically off trailer 12 to the position shown in FIG. 4.

Once abutment member 6 engages carrier members 5 as shown in FIG. 4, carrier members 5 have reached the upper end of the vertical part of their path of travel. Further rotation of coupling links 3 about horizontal axis X relative to support posts 1 under the action of rams 7, cause abutment member 6 to displace carrier members 5 so that they rotate upwardly with coupling links 3 along an arcuate path about horizontal axis X in the direction of arrow B, until coupling links 3 reach their upper extreme positions shown in FIG. 5 in which rams 7 reach the limit of their extension. In the upper extreme positions of coupling links 3 shown in FIG. 5, carrier members 5 are in an intermediate position along their path of travel and have not yet reached their elevated extreme positions in which material is discharged from bin 11.

Figure 5:
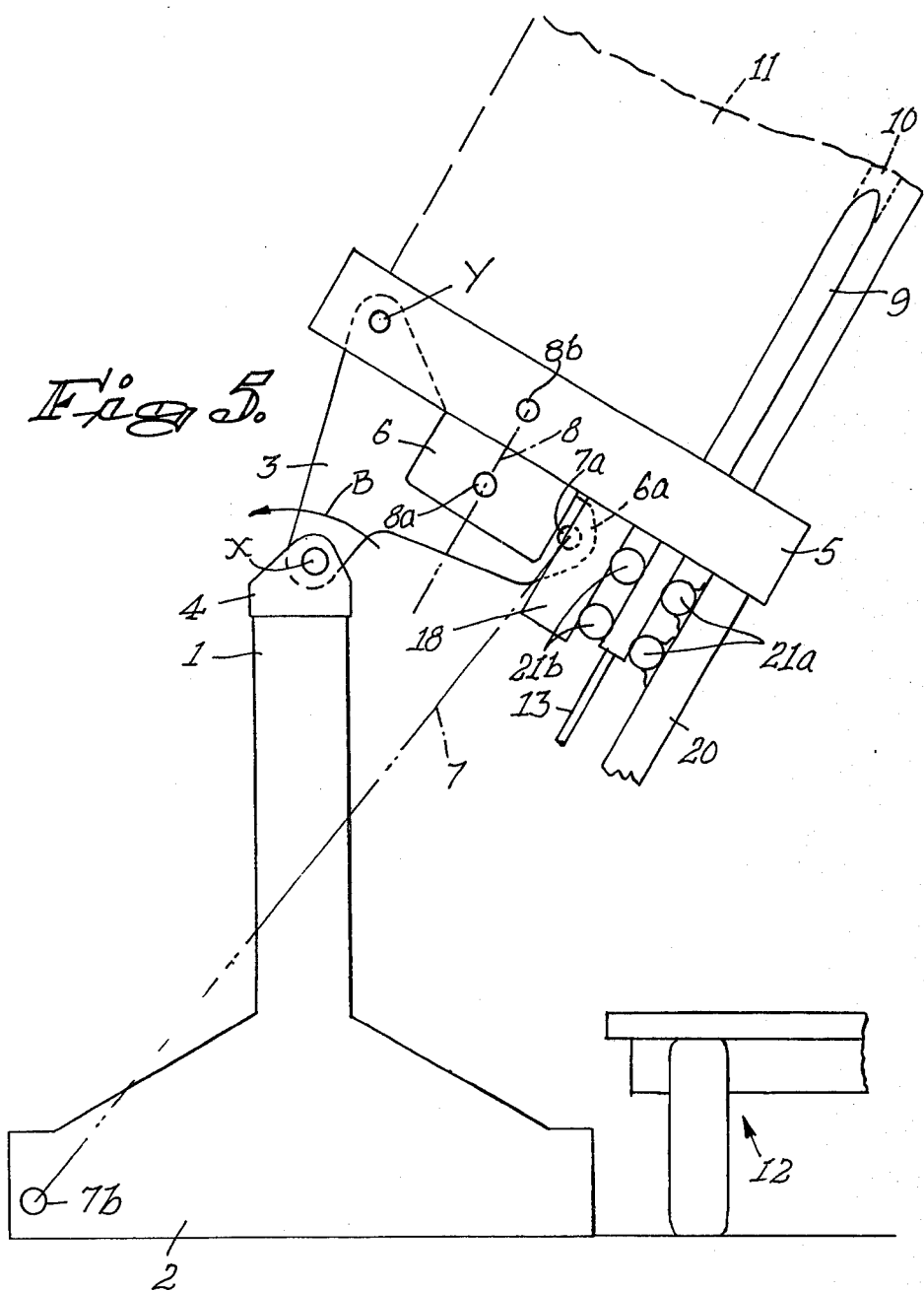
Figure 6:
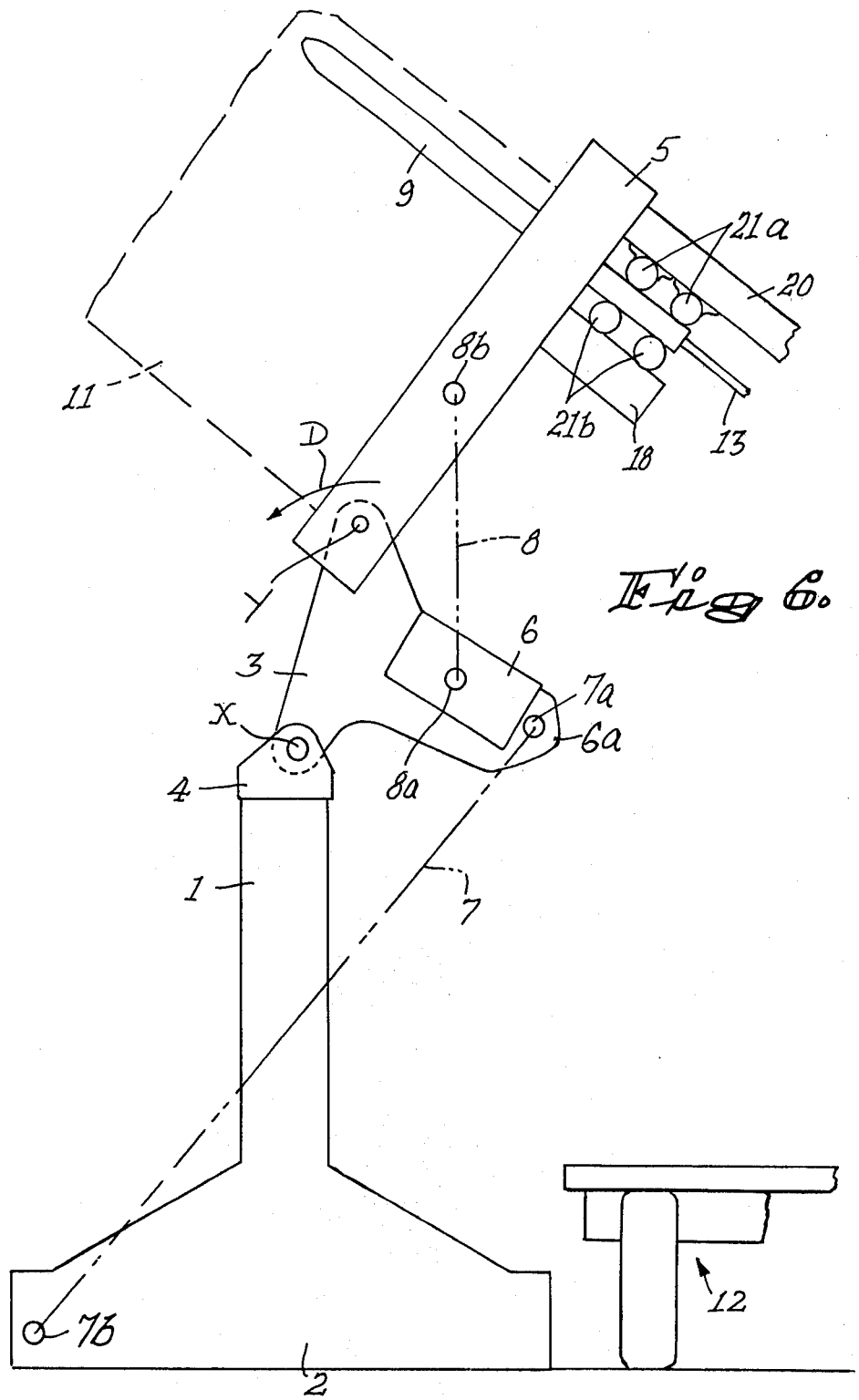

Rams 8 are then extended to rotate carrier members 5 upwardly relative to coupling links 3 about horizontal axis Y in the direction of arrow D, from the intermediate positions of carrier members 5 shown in FIG. 5 to their elevated extreme positions shown in FIG. 6 in which bin 11 is overturned or tilted so that it can discharge its contents automatically under the influence of gravity. Tines 9 which are engaged in sockets 10 in bin 11 retain the latter in position on carrier members 5 and prevent bin 11 from sliding off carrier members 5.

Once the contents of bin 11 have been discharged, bin 11 is returned to trailer 12 by first collapsing rams 8 to rotate carrier members 5 downwardly about axis Y relative to coupling links 3, thereby to move carrier members 5 from their elevated extreme positions shown in FIG. 6 to their intermediate positions shown in FIG. 5. Thereafter, rams 7 are collapsed to rotate coupling links 3 downwardly about axis X relative to support posts 1, thereby to move coupling links 3 from their upper extreme positions shown in FIG. 5 to their intermediate positions shown in FIG. 4. During this movement abutment member 6 retains carrier members 5 in position relative to coupling links 3 so that carrier members 5 rotate downwardly with coupling links 3 about axis X along an arcuate path from the intermediate positions of carrier members 5 shown in FIG. 5 to their vertical positions at the upper end of the vertical part of their path of travel as shown in FIG. 4. Upon further collapse of rams 7, coupling links 5 are rotated further relative to support posts 1 about axis X from their intermediate positions shown in FIG. 4 to their lower extreme positions shown in FIG. 3. During this downward rotation of coupling links 3, abutment formations 6 move away from carrier members 5 so that the latter are again freely rotatable relative to coupling links 3 and are free to retain their vertical dispositions shown in FIGS. 1, 2, 3 and 4.

As the ends of coupling links 3 to which carrier members 5 are connected move downwardly, carrier members 5 move substantially vertically downwardly to replace bin 11 vertically downwardly onto trailer 12.

As can be seen in FIGS. 5 and 6, bin 11 slides along tines 9 into contact with carrier members 5 during the tipping operation. When bin 11 is replaced on trailer 12, positioning rams 14 are extended horizontally in the direction of arrow E as shown in FIG. 7, thereby correctly to locate bin 11 on trailer 12 in a position spaced from carrier members 5, before tines 9 are withdrawn horizontally from sockets 10 by collapse of rams 13 to return the tipping apparatus to its inoperative condition shown in FIGS. 1 and 2. The empty bin 11 can then be moved away on trailer 12.

It will be appreciated that the tipping apparatus itself lifts the full bin 11 directly from trailer 12 in a substantially vertical direction and also replaces the empty bin 11 directly onto trailer 12 in a substantially vertical direction. The unloading operation is thus facilitated and expedited.

It will be appreciated that many variations in detail are possible without departing from the spirit of the invention.

For example, as shown in FIG. 1, a guide plate 22 may be provided between carrier members 5 at their upper ends to act as a chute to facilitate the discharge of material from bin 11 when the apparatus is in the discharging condition shown in FIG. 6.

Instead of the tipping apparatus being arranged to engage and lift a bin 11 which is located on a trailer, the apparatus may be arranged for the lowered extreme position of carrier members 5 to be at such a low level that tines 9 can engage a container resting on the ground.

Instead of coupling links 3 being movable from their lower extreme positions shown in FIG. 3, through the intermediate positions shown in FIG. 4 to the upper extreme positions shown in FIG. 5, the positions of coupling links 3 shown in FIG. 4 in which abutment member 6 engages carrier members 5, may comprise their upper extreme positions beyond which they cannot move further. The mounting of carrier members 5 on coupling links 3 and the arrangement of rams 8 may then be such that rams 8 can rotate carrier members 5 relative to coupling links 3 about horizontal axis Y—Y in the direction of arrow D (FIG. 6), from the position of carrier members 5 shown in FIG. 4 to elevated extreme positions similar to that shown in FIG. 6 in which the contents of bin 11 may discharge under gravity.

With this arrangement, the coupling links 3 are located in their upper extreme positions when the carrier members 5 are at the upper end of the vertical part of their path of travel, the carrier members 5 being rotatable relative to the coupling links 3 for movement of the carrier members 5 between the upper end of the vertical part of their path of travel and their elevated extreme positions. In other words, coupling links 3 move carrier members 5 only along the vertical part of the path of travel of the latter, movement of carrier members 5 in the region of their path of travel between the upper end of the vertical part of their path of travel and their elevated extreme positions, being arcuate rotational movement relative to coupling links 3.

It is also possible to arrange the apparatus to dispense with rams 8 altogether, the arrangement being such that coupling links 3 are rotatable by rams 7 relative to support posts 2 about horizontal axis X—X in the direction of arrow B (FIG. 5), from the positions of carrier members 5 shown in FIG. 4 to upper extreme positions beyond that shown in FIG. 5, so that carrier members 5 are located in elevated extreme positions similar to that shown in FIG. 6 to permit discharge of the contents of bin 11 under gravity.

With this arrangement, the carrier members 5 are located in their elevated material discharging extreme positions when the coupling links 3 are in their upper extreme positions. The carrier members 5 are movable vertically with the coupling links 3 along the vertical part of the path of travel of the carrier members 5 and are also movable arcuately with the coupling links 3 in the region of the path of travel of the carrier members 5 between the upper end of the vertical part of their path of travel and their elevated extreme positions. Thus the carrier members 5 move along their entire path of travel with the coupling links 3.

According to the above description, tines 9 are first extended into engagement with sockets 10 in bin 11 before rams 7 are actuated to commence the vertical lift of carrier members 5 and tines 9. Where sockets 10 in bin 11 are not at the same level as tines 9 when bin 11 is located on trailer 12, carrier members 5 may first be lifted vertically to bring tines 9 in line with sockets 10 before tines 9 are extended into engagement with sockets 10. Thereafter, the vertical lift may be continued to lift bin 11 off trailer 12 and proceed with a tipping operation.

We claim:

1. A container tipping apparatus, comprising:
   support means;
   carrier means;
   coupling means for coupling said support means to said carrier means;
   first means for rotatably mounting said coupling means to said support means so that said coupling means is rotatable relative to said support means between a first lowest extreme position and a first elevated extreme position;
   second means for rotatably mounting said carrier means to said coupling means;
   means for rotating said coupling means and said carrier means so that said carrier means is rotatable between a second lowest extreme position whereat said carrier means is engaged with a container located adjacent said tipping apparatus and a second elevated extreme position whereat said container is positioned to discharge its contents due to gravitational forces;
   said second rotatable mounting means allowing said carrier means to rotate freely relative to said coupling means and in a direction opposite to a direction of rotation of said coupling means as said coupling means is rotated by said rotating means between said first lowest extreme position and a position above said first lowest extreme position;
   said first rotatable mounting means being fixed in position and located at a predetermined height, said second rotatable mounting means being movable and being located at a height below said fixed predetermined height when said coupling means and said carrier means are at said first and second lowest extreme positions, respectively, said second rotatable mounting means being located at a height above said predetermined height when said coupling means is at said position above said first lowest extreme position; and
   said coupling means including an abutment member which engages said carrier means after said coupling means has been rotated to said position above said first lowest extreme position from said first lowest extreme position, said abutment member causing said carrier means to rotate integrally with said coupling means as said coupling means is further rotated by said rotating means between said position above said first lowest extreme position and said first elevated extreme position.

2. The apparatus as claimed in claim 1 wherein said second rotatable mounting means allows said carrier means to rotate freely relative to said coupling means as said carrier means is moved from said second lowest extreme position towards said second elevated extreme position so that said carrier means is initially displaced in a substantially vertical direction as said rotating means rotates said coupling means from said first lowest extreme position towards said position above said first lowest extreme position.

3. The apparatus as claimed in claim 2 wherein said second rotatable mounting means allows said carrier means to rotate freely relative to said coupling means and in a direction opposite to a direction of rotation of said coupling means as said coupling means is rotated by said rotating means from said position above said first lowest extreme position to said first lowest extreme position so that said carrier means is displaced in a substantially vertical direction as said rotating means rotates said coupling means from said position above said first lowest extreme position towards said first lowest extreme position.

4. The apparatus as claimed in claim 2 or 3 wherein said carrier means is movable arcuately in a region of its path of travel between an upper end of its initial vertical displacement and said second elevated extreme position.

5. The apparatus as claimed in claim 1 or 2 wherein said carrier means includes engagement means adapted to engage and disengage said container located adjacent said tipping apparatus when said carrier means is at said first lowest extreme position.

6. The apparatus as claimed in claim 1 or 3 wherein said rotating means rotates said carrier means integrally with said coupling means along an arcuate path as said coupling means is rotated between said position above said first lowest extreme position and said first elevated extreme position.

7. The apparatus as claimed in claim 5 wherein said engagement means comprises at least one elongated element movable into and out of a socket in said container.

8. A container tipping apparatus, comprising:
   support means;
   carrier means;
   coupling means for coupling said support means to said carrier means;
   first means for rotatably mounting said coupling means to said support means so that said coupling means is rotatable relative to said support means between a first lowest extreme position and a first elevated extreme position;
   second means for rotatably mounting said carrier means to said coupling means;
   means for rotating said coupling means and said carrier means so that said carrier means is rotatable between a second lowest extreme position whereat said carrier means is engaged with a container located adjacent said tipping apparatus and a second elevated extreme position whereat said container is positioned to discharge its contents due to gravitational forces;

said second rotatable mounting means allowing said carrier means to rotate freely relative to said coupling means and in a direction opposite to a direction of rotation of said coupling means as said coupling means is rotated by said rotating means between said first lowest extreme position and a position above said first lowest extreme position;

said rotating means rotating said carrier means integrally with said coupling means along an arcuate path as said coupling means is rotated between said position above said first lowest extreme position and said first elevated extreme position;

said coupling means including an abutment member which engages said carrier means after said coupling means has been rotated to said position above said first lowest extreme position from said first lowest extreme position, said abutment member causing said carrier means to rotate integrally with said coupling means as said coupling means is further rotated by said rotating means from said position above said first lowest extreme position to said first elevated extreme position.

9. The apparatus as claimed in claim 8 wherein said rotating means comprises at least one fluid-operatable ram.

10. The apparatus as claimed in claim 8 wherein said carrier means is moved to and is located at said second elevated extreme position when said coupling means is moved to and is located at said first elevated position.

11. A container tipping apparatus, comprising:
support means;
carrier means;
coupling means for coupling said support means to said carrier means;
first means for rotatably mounting said coupling means to said support means so that said coupling means is rotatable relative to said support means between a first lowest extreme position and a first elevated extreme position;
second means for rotatably mounting said carrier means to said coupling means;
means for rotating said coupling means and said carrier means so that said carrier means is rotatable between a second lowest extreme position whereat said carrier means is engaged with a container located adjacent said tipping apparatus and a second elevated extreme position whereat said container is positioned to discharge its contents due to gravitational forces;
said second rotatable mounting means allowing said carrier means to rotate freely relative to said coupling means and in a direction opposite to a direction of rotation of said coupling means as said coupling means is rotated by said rotating means between said first lowest extreme position and a position above said first lowest extreme position;
said rotating means rotating said carrier means integrally with said coupling means along an arcuate path as said coupling means is rotated between said position above said first lowest extreme position and said first elevated extreme position;
said carrier means being located at an intermediate position which is below said second elevated extreme position when said coupling means is at said first elevated extreme position, said rotating means including means for further rotating said carrier means relative to said coupling means for further movement of said carrier means between said intermediate position and said second elevated extreme position.

12. A container tipping apparatus, comprising:
support means;
carrier means;
coupling means for coupling said support means to said carrier means;
first means for rotatably mounting said coupling means to said support means so that said coupling means is rotatable relative to said support means between a first lowest extreme position and a first elevated extreme position;
second means for rotatably mounting said carrier means to said coupling means;
means for rotating said coupling means and said carrier means so that said carrier means is rotatable between a second lowest extreme position whereat said carrier means is engaged with a container located adjacent said tipping apparatus and a second elevated extreme position whereat said container is positioned to discharge its contents due to gravitational forces;
said second rotatable mounting means allowing said carrier means to rotate freely relative to said coupling means and in a direction opposite to a direction of rotation of said coupling means as said coupling means is rotated by said rotating means between said first lowest extreme position and a position above said first lowest extreme position;
said second rotatable mounting means allowing said carrier means to rotate freely relative to said coupling means as said carrier means is moved from said second lowest extreme position towards said second elevated extreme position so that said carrier means is initially displaced in a substantially vertical direction as said rotating means rotates said coupling means from said first lowest extreme position towards said position above said first lowest extreme position;
said coupling means being located at said first elevated extreme position when said carrier means is at an upper end of its vertical displacement, said rotating means including means for further rotating said carrier means relative to said coupling means for further movement of said carrier means between said upper end of said vertical displacement and said second elevated extreme position.

13. A container tipping apparatus, comprising:
support means;
carrier means;
coupling means for coupling said support means to said carrier means;
first means for rotatably mounting said coupling means to said support means so that said coupling means is rotatable relative to said support means between a first lowest extreme position and a first elevated extreme position;
second means for rotatably mounting said carrier means to said coupling means;
means for rotating said coupling means and said carrier means so that said carrier means is rotatable between a second lowest extreme position whereat said carrier means is engaged with a container located adjacent said tipping apparatus and a second elevated extreme position whereat said container is positioned to discharge its contents due to gravitational forces;

said second rotatable mounting means allowing said carrier means to rotate freely relative to said coupling means and in a direction opposite to a direction of rotation of said coupling means as said coupling means is rotated by said rotating means between said first lowest extreme position and a position above said first lowest extreme position;

said first rotatable mounting means being fixed in position and located at a predetermined height, said second rotatable mounting means being movable and being located at a height below said fixed predetermined height when said coupling means and said carrier means are at said first and second lowest extreme positions, respectively, said second rotatable mounting means being located at a height above said predetermined height when said coupling means is at said position above said first lowest extreme position; and said carrier means being located at an intermediate position which is below said second elevated extreme position when said coupling means is at said first elevated extreme position, said rotating means including means for further rotating said carrier means relative to said coupling means for further movement of said carrier means between said intermediate position and said second elevated extreme position.

14. The apparatus as claimed in claim 13, wherein said second rotatable mounting means allows said carrier means to rotate freely relative to said coupling means as said carrier means is moved from said second lowest extreme position towards said second elevated extreme position so that said carrier means is initially displaced in a substantially vertical direction as said rotating means rotates said coupling means from said first lowest extreme position towards said position above said first lowest extreme position.

15. The apparatus as claimed in claim 14, wherein said second rotatable mounting means allows said carrier means to rotate freely relative to said coupling means and in a direction opposite to a direction of rotation of said coupling means as said coupling means is rotated by said rotating means from said position above said first lowest extreme position to said first lowest extreme position.

16. A container tipping apparatus, comprising:
supporting means;
carrier means;
coupling means for coupling said support means to said carrier means;
first means for rotatably mounting said coupling means to said support means so that said coupling means is rotatable relative to said support means between a first lowest extreme position and a first elevated extreme position;
second means for rotatably mounting said carrier means to said coupling means;
means for rotating said coupling means and said carrier means so that said carrier means is rotatable between a second lowest extreme position whereat said carrier means is engaged with a container located adjacent said tipping apparatus and a second elevated extreme position whereat said container is positioned to discharge its contents due to gravitational forces;
said second rotatable mounting means allowing said carrier means to rotate freely relative to said coupling means and in a direction opposite to a direction of rotation of said coupling means as said coupling means is rotated by said rotating means between said first lowest extreme position and a position above said first lowest extreme position;

said first rotatable mounting means being fixed in position and located at a predetermined height, said second rotatable mounting means being movable and being located at a height below said fixed predetermined height when said coupling means and said carrier means are at said first and second lowest extreme positions, respectively, said second rotatable mounting means being located at a height above said predetermined height when said coupling means is at said position above said first lowest extreme position; and said coupling means being located at said first elevated extreme position when said carrier means is at an upper end of its vertical displacement, said rotating means including means for further rotating said carrier means relative to said coupling means for further movement of said carrier means between said upper end of said vertical displacement and said second elevated extreme position.

17. A container tipping apparatus, comprising:
supporting means;
carrier means;
coupling means for coupling said support means to said carrier means;
first means for rotatably mounting said coupling means to said support means so that said coupling means is rotatable relative to said support means between a first lowest extreme position and a first elevated extreme position;
second means for rotatably mounting said carrier means to said coupling means;
means for rotating said coupling means and said carrier means so that said carrier means is rotatable between a second lowest extreme position whereat said carrier means is engaged with a container located adjacent said tipping apparatus and a second elevated extreme position whereat said container is positioned to discharge its contents due to gravitational forces;
said second rotatable mounting means allowing said carrier means to rotate freely relative to said coupling means and in a direction opposite to a direction of rotation of said coupling means as said coupling means is rotated by said rotating means between said first lowest extreme position and a position above said first lowest extreme position;
said first rotatable mounting means being fixed in position and located at a predetermined height, said second rotatable mounting means being movable and being located at a height below said fixed predetermined height when said coupling means and said carrier means are at said first and second lowest extreme positions, respectively, said second rotatable mounting means being located at a height above said predetermined height when said coupling means is at said position above said first lowest extreme position; and
positioning means for positioning said container onto a support surface when said carrier means is lowered to said second lowest extreme position by said rotating means.

* * * * *

UNITED STATES PATENT AND TRADEMARK OFFICE
CERTIFICATE OF CORRECTION

PATENT NO. : 4,447,185

DATED : May 8, 1984

INVENTOR(S) : David S. Robinson et al

It is certified that error appears in the above-identified patent and that said Letters Patent is hereby corrected as shown below:

On the title page assignee should read

--(73) Assignee: Mhlume (Swaziland) Sugar Company
Limited, Mhlume, Swaziland --.

Signed and Sealed this

Second Day of September 1986

[SEAL]

Attest:

Attesting Officer

DONALD J. QUIGG

Commissioner of Patents and Trademarks